(12) United States Patent
He et al.

(10) Patent No.: US 8,446,085 B2
(45) Date of Patent: May 21, 2013

(54) FLUORESCENT LAMP WITH ZINC SILICATE PHOSPHOR AND PROTECTIVE PHOSPHOR LAYER

(75) Inventors: Jianmin He, Orange, OH (US); Jon Bennett Jansma, Pepper Pike, OH (US); William Erwin Cohen, Solon, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/242,903

(22) Filed: Sep. 23, 2011

(65) Prior Publication Data
US 2013/0076226 A1    Mar. 28, 2013

(51) Int. Cl.
*H01J 1/62* (2006.01)
*H01J 63/04* (2006.01)

(52) U.S. Cl.
USPC ...... 313/486; 313/485; 313/487; 252/301.4 R

(58) Field of Classification Search
CPC .... C09K 11/03; C09K 11/05; H01J 1/62; H01J 63/04
USPC .......... 445/23; 313/48, 623, 627; 250/484.4; 427/67; 252/301.4 H
See application file for complete search history.

(56) References Cited

U.S. PATENT DOCUMENTS

| | | |
|---|---|---|
| 3,858,082 A | 12/1974 | Thornton |
| 3,886,396 A | 5/1975 | Hammer et al. |
| 4,034,257 A | 7/1977 | Hoffman |
| 4,039,889 A | 8/1977 | Vicai |
| 4,208,448 A | 6/1980 | Panaccione |
| 4,241,276 A | 12/1980 | Wyner |
| 4,305,019 A | 12/1981 | Graff et al. |
| 4,315,192 A | 2/1982 | Skwirat et al. |
| 4,315,195 A | 2/1982 | Redel et al. |
| 4,363,998 A | 12/1982 | Graff et al. |
| 4,393,330 A | 7/1983 | Skwirut et al. |
| 4,547,700 A | 10/1985 | Landry |
| 4,607,191 A | 8/1986 | Flaherty |
| 4,710,674 A | 12/1987 | Sigai |
| 4,728,459 A | 3/1988 | Fan |
| 4,925,703 A | 5/1990 | Kasenga et al. |
| 4,946,707 A | 8/1990 | Kasenga |
| 4,950,948 A | 8/1990 | Peters et al. |
| 4,952,422 A | 8/1990 | Pappalardo |
| 4,979,893 A | 12/1990 | Pappalardo et al. |

(Continued)

FOREIGN PATENT DOCUMENTS

| | | |
|---|---|---|
| DE | 2624898 A1 | 12/1976 |
| GB | 2054261 A | 2/1981 |
| JP | 2008059943 A | 3/2008 |

OTHER PUBLICATIONS

Search Report and Written Opinion from Corresponding PCT Application No. PCT/US2012/055480 dated Nov. 22, 2012.

*Primary Examiner* — Tracie Y Green
(74) *Attorney, Agent, or Firm* — Pearne & Gordon LLP

(57) ABSTRACT

A fluorescent lamp comprises a glass envelope that is light transmitting. Also included is means for providing a discharge inside the envelope. A discharge-sustaining fill includes mercury and an inert gas sealed inside the envelope. An underlying phosphor-containing layer is disposed inside the envelope. The underlying layer includes zinc silicate phosphor. A protective phosphor-containing layer is disposed over the underlying layer at a location that is more distal from the glass than the underlying layer. A ratio of a surface density of the protective layer to a surface density of the underlying layer is at least 0.4:1.

31 Claims, 3 Drawing Sheets

U.S. PATENT DOCUMENTS

| | | |
|---|---|---|
| 5,051,277 A | 9/1991 | Sigai |
| 5,087,523 A | 2/1992 | Sigai |
| 5,151,215 A | 9/1992 | Sigai |
| 5,188,763 A | 2/1993 | Chenot et al. |
| 5,196,234 A | 3/1993 | Taubner et al. |
| 5,309,069 A | 5/1994 | Sigai et al. |
| 5,602,444 A | 2/1997 | Jansma |
| 5,604,396 A | 2/1997 | Watanabe et al. |
| 5,612,590 A | 3/1997 | Trushell |
| 5,644,193 A | 7/1997 | Matsuda |
| 5,714,836 A | 2/1998 | Hunt et al. |
| 6,423,248 B1 | 7/2002 | Rao |
| 6,472,812 B2 | 10/2002 | Vose et al. |
| 6,683,405 B2 | 1/2004 | Carter |
| 2009/0128742 A1 | 5/2009 | Hashimoto et al. |
| 2011/0037378 A1 | 2/2011 | Yagi et al. |

FLUORESCENT LAMP WITH ZINC SILICATE PHOSPHOR AND PROTECTIVE PHOSPHOR LAYER

FIELD OF THE INVENTION

This disclosure relates to fluorescent lamps and phosphor layer design. In particular, it is related to improving lumen maintenance of fluorescent lamps utilizing zinc silicate phosphor.

BACKGROUND OF THE INVENTION

Fluorescent lamps are well known and comprise a tubular hermetically sealed glass envelope including electrodes at ends thereof. Inside the envelope is an arc discharge sustaining medium, usually at a low pressure, including inert gases and a small amount of mercury. The inside of the glass envelope is typically coated with a layer of phosphor, which absorbs ultraviolet electromagnetic radiation of 254 nm and 185 nm generated by the excited mercury arc and emits in a region of visible light. Such lamp usually experiences a gradual decrease in light output (measured in lumens) with the increase of lamp usage (measured in hours burned).

Ideally, phosphors should absorb the 254 nm and 185 nm emission strongly and convert them into visible light efficiently. But in reality, most of the 185 nm wavelength radiation is wasted, which lowers the overall efficiency of the lamp. Moreover, 185 nm emission also leads to formation of color center—a type of point defect-in phosphors, which decreases the phosphor conversion efficiency and lumen output of lamps over their life cycle. There are other notable problems associated with phosphors in fluorescent lamps. The phosphor coating is exposed to both ion bombardment and chemical reaction from the mercury discharge which is a reducing medium. In addition, during phosphor synthesis and lamp fabrication process, phosphors are usually exposed to an oxygen-rich atmosphere which tends to partially oxidize reactive lower-valence ions in the phosphor lattice. These problems lead to the overall degradation of phosphors and their lumen output over life. Among several phosphors which severely suffer from the lumen depreciation issue, $Zn_2SiO_4:Mn^{2+}$ phosphor has been excluded from current commercial use in fluorescent lamp manufacturing, despite development efforts to resolve the issue.

BRIEF DESCRIPTION OF THE INVENTION

This disclosure features a fluorescent lamp comprising a glass envelope that is light transmitting. Also included is means for providing a discharge inside the envelope (e.g., electrodes spaced apart in the envelope). A discharge-sustaining fill includes mercury and an inert gas sealed inside the envelope. An underlying phosphor-containing layer is disposed inside the envelope. The underlying layer includes zinc silicate phosphor (e.g., $Zn_2SiO_4:Mn^{2+}$, which is zinc silicate activated with manganese). The protective phosphor-containing layer is disposed over the underlying layer at a location that is more distal from the glass than the underlying layer. A ratio of a surface density of the protective layer to a surface density of the underlying layer is at least 0.4:1.

Regarding specific features of the fluorescent lamp, the ratio is at least 0.7:1, in particular, at least 1.0:1; at least 2.0:1; or at least 3.0:1. A surface density of the underlying layer is at least about 0.7 mg/cm², in particular, at least about 1.0 mg/cm² or more specifically, at least about 2.0 mg/cm². A combined surface density of the underlying layer and the protective layer ranges from 2.0 to 4.0 mg/cm² or from about 2.0 to about 3.0 mg/cm². The protective layer can absorb radiation at a wavelength of 185 nm from the discharge.

The underlying layer or the protective layer comprise a phosphor selected from the group consisting $Y_2O_3:Eu^{3+}$ (YEO); $BaMg_2Al_{16}O_{27}:Eu^{2+}$ (BAM); $BaMg_2Al_{16}O_{27}:Eu^{2+}, Mn^{2+}$ (BAMn); $GdMgB_5O_{10}:Ce^{3+}, Mn^{3+}$ (CBM); $MgAl_{11}O_{19}:Ce^{3+}, Tb^{3+}$ (CAT); $GdMgB_5O_{10}:Ce^{3+}, Tb^{3+}$ (CBT)); $LaPO_4:Ce^{3+}, Tb^{3+}$ (LAP); $(Sr,Ba,Ca)_5(PO_4)_3Cl:Eu^{2+}$ (SECA); $(Ca,Ba,Sr)_5(PO_4)_3(F,Cl):Sb^{3+}, Mn^{2+}$ (halophosphor), and combinations thereof.

In particular, the phosphor of the protective layer can comprise YEO, LAP and BAM; or YEO, LAP and SECA. The phosphor of the underlying layer can comprise $Zn_2SiO_4:Mn^{2+}$, YEO and BAM; or $Zn_2SiO_4:Mn^{2+}$, YEO and SECA. $Zn_2SiO_4:Mn^{2+}$ phosphor can be the only phosphor in the underlying layer. The phosphor of the protective layer can comprise YEO, LAP and BAM; or YEO, LAP and SECA and the underlying layer can comprise $Zn_2SiO_4:Mn^{2+}$, YEO and BAM; or $Zn_2SiO_4:Mn^{2+}$, YEO and SECA.

Regarding further specific features of the lamp performance, more desirable is a color rendering index (CRI) of at least 87 or lumens per watt (LPW) of at least 89. A correlated color temperature (CCT) of the lamp, as defined by the x-y chromaticity coordinates as provided on the x-y chromaticity diagram of the ICI system, ranges from 2700° K to 6500° K. The x-y chromaticity of the underlying layer could be different than that of the protective layer. Other layers could be disposed under the underlying layer, between the underlying and protective layer, and on top of the protective layer. A barrier layer can be disposed between the glass and the underlying layer. The barrier layer can comprise alumina or silica.

Many additional features, advantages and a fuller understanding of the invention will be had from the accompanying drawings and the Detailed Description of the Invention that follows. It should be understood that the above Brief Description of the Invention describes the invention in broad terms while the following Detailed Description of the Invention describes the invention more narrowly and presents embodiments that should not be construed as necessary limitations of the broad invention as defined in the claims.

DETAILED DESCRIPTION OF THE INVENTION

Figure 1:
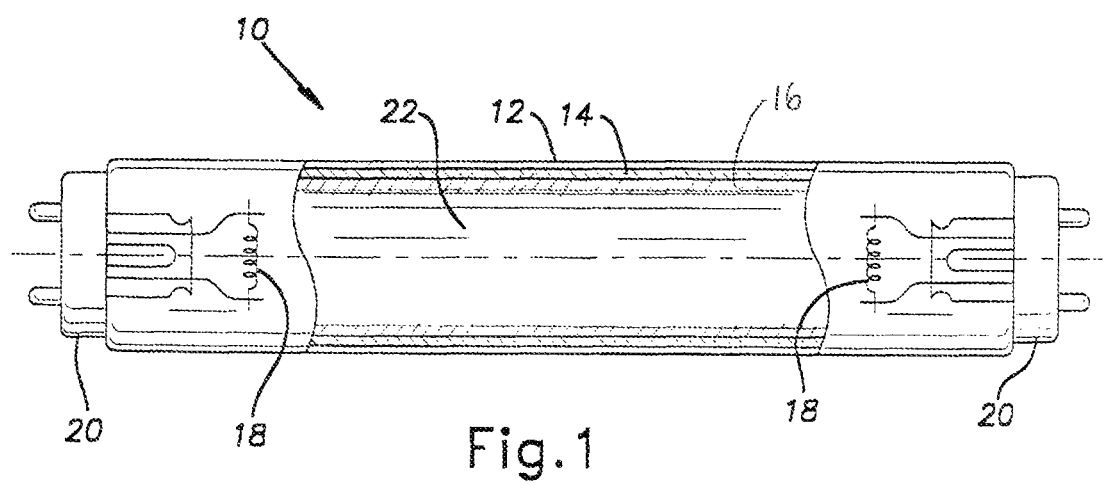
FIG. 1 shows diagrammatically, and partially in section, a fluorescent lamp made according to this disclosure.

This disclosure features a fluorescent lamp comprising a glass envelope that is light transmitting. There is means for providing a discharge inside the envelope. A discharge-sustaining fill of mercury and an inert gas is sealed inside the envelope. An underlying phosphor-containing layer is coated inside the envelope. The underlying layer comprises $Zn_2SiO_4:Mn^{2+}$ phosphor. A protective phosphor-containing layer is disposed over the underlying layer at a location that is more distal from the glass than the underlying layer. Any phosphor can be combined with $Zn_2SiO_4:Mn^{2+}$ in the underlying layer. Any phosphor can be used in the protective layer;

it may absorb radiation having a wavelength of 185 nm so as to protect the $Zn_2SiO_4:Mn^{2+}$ phosphor from this radiation.

Regarding more specific aspects of this disclosure the underlying layer or the protective layer comprise a phosphor selected from the group consisting of $Y_2O_3:Eu^{3+}$ (YEO) emitting red-orange light with a peak wavelength of 611 nm; $BaMg_2Al_{16}O_{27}:Eu^{2+}$ (BAM) emitting blue light with a peak wavelength of 450 nm; $BaMg_2Al_{16}O_{27}:Eu^{2+}, Mn^{2+}$ (BAMn) emitting blue-green light with a peak wavelength of 450/515 nm; $GdMgB_5O_{10}:Ce^{3+}, Mn^{3+}$ (CBM) emitting red light with a peak wavelength of 625 nm; $MgAl_{11}O_{19}:Ce^{3+}, Tb^{3+}$ (CAT) emitting green light with a peak wavelength of 543 nm; $GdMgB_5O_{10}:Ce^{3+}, Tb^{3+}$ (CBT) emitting green light with a peak wavelength of 545 nm; $LaPO_4:Ce^{3+}, Tb^{3+}$ (LAP) emitting green light with a peak wavelength of 544 nm; $(Sr,Ba,Ca)_5(PO_4)_3Cl:Eu^{2+}$ (SECA) emitting blue light with a peak wavelength of 445-470 nm; $(Ca,Ba,Sr)_5(PO_4)_3(F,Cl):Sb^{3+}, Mn^{2+}$ (halophosphor), for example, $Ca_5(PO_4)_3(F,Cl):Sb^{3+}, Mn^{2+}$ (calcium halophosphate) emitting white light, and combinations thereof. The amounts and types of each phosphor in the underlying layer and in the protective layer can be selected to produce the desired CCT of the lamp (2700° K to 6500° K) as would be understood by one of ordinary skill in the art in view of this disclosure.

Typically there are two or more phosphors in the underlying layer and two or more phosphors in the protective layer. There can be three or more phosphors in the underlying layer and three or more phosphors in the protective layer. When more than one phosphor is used they are typically blended or used in a physical mixture in which each phosphor retains its unique chemical properties. On the other hand, the $Zn_2SiO_4:Mn^{2+}$ phosphor can be the only phosphor in the underlying layer. In addition, there can be only one phosphor in the protective phosphor-containing layer, e.g., LAP. The underlying layer can comprise one or more of the above phosphors combined with the $Zn_2SiO_4:Mn^{2+}$ phosphor.

For example, the phosphor of the protective layer can comprise YEO, LAP and BAM; or YEO, LAP and SECA. The phosphor of the underlying layer can comprise $Zn_2SiO_4:Mn^{2+}$, YEO and BAM; or $Zn_2SiO_4:Mn^{2+}$, YEO and SECA. The phosphor of the protective layer can comprise YEO, LAP and BAM; or YEO, LAP and SECA, while the phosphor of the underlying layer can comprise $Zn_2SiO_4:Mn^{2+}$, YEO and BAM; or $Zn_2SiO_4:Mn^{2+}$, YEO and SECA.

More specifically, fluorescent lamp 10 has a light-transmissive glass tube or envelope 12 which has a circular cross-section. The inner surface of the glass envelope is coated with the underlying layer 14. The protective layer 16 is provided over the underlying layer. The lamp is hermetically sealed by bases 20 attached at both ends, and a pair of spaced electrode structures 18 at each end of the lamp (which are means for providing a discharge) are respectively mounted on the bases 20. A discharge-sustaining fill 22 of mercury and an inert gas is sealed inside the glass tube. The inert gas is typically argon or a mixture of argon and other noble gases at low pressure which, in combination with a small quantity of mercury, provide the low vapor pressure manner of operation.

The underlying layer 14 and protective layer 16 are preferably utilized in a low pressure mercury vapor discharge lamp, but may also be used in a high pressure mercury vapor discharge lamp. As used herein, a "fluorescent lamp" is any mercury vapor discharge fluorescent lamp as known in the art, including fluorescent lamps having electrodes, and electrodeless fluorescent lamps where the means for providing a discharge include a radio transmitter adapted to excite mercury vapor atoms via transmission of an electromagnetic signal. A "T8 lamp" can be used in this disclosure and is a fluorescent lamp as known in the art, e.g., linear, nominally 48 inches in length, and having a nominal outer diameter of 1 inch (eight times ⅛ inch, which is where the "8" in "T8" comes from). The T8 fluorescent lamp can also be nominally 2, 3, 6 or 8 feet long, or some other length. T5 and T12 lamps known in the art can also utilize the underlying and protective layers of this disclosure. The fluorescent lamp can have a "non-straight glass envelope" which includes (but is not limited to) a glass envelope or tube which is in the shape of an L or a U (such as a 4 foot T8 or T12 lamp bent into a U-shape), a circular glass envelope as is known in the art, the glass envelope of a compact fluorescent lamp (e.g., a helical compact fluorescent lamp), and other glass envelopes which are not a straight cylindrical glass envelope. Compact fluorescent lamps are well known; see U.S. Pat. Nos. 2,279,635; 3,764,844; 3,899,712; 4,503,360; 5,128,590; 5,243,256; 5,451,104; and German Patent Application No. DE 4133077 filed in Germany on Oct. 2, 1991.

The underlying layer 14 and protective layer 16 are provided on the lamp as follows. The underlying layer coating is prepared as codispersion of phosphor particles in an aqueous vehicle containing colloidal alumina or silica. The alumina or silica is present in an amount of about 10 weight % to 50 weight % of the total amount of phosphor used in the underlying layer. The coating formulation is typically kept slightly basic by use of ammonia. Then an acrylic-based thickener, typically, is added together with surfactants. The suspension is then applied as a coating to the inside of the glass tube used to make the fluorescent lamp and heated to dry, as is known in the art. The phosphor-containing underlying layer is applied so that the weight of phosphor in the layer (the "coating weight") is 0.5-3, more specifically 0.8-2 mg/cm².

The phosphor powder of the protective layer is first dispersed in a water vehicle containing colloidal alumina or silica with a dispersing agent such as ammonium polyacrylate and a nonionic surfactant such as nonylphenyl-ethoxylate, though any suitable nonionic surfactant can be used. The alumina or silica is present in an amount of about 0.2-4 weight % of the phosphor used in the protective layer. Then a thickener is added as a viscosity controlling agent, typically polyethylene oxide having a molecular weight in the range of 200,000 to 1,000,000 g/mol, and optionally other dispersing agents, surfactants, and thickeners known in the art may be added. The resulting suspension is typically about 20-40 weight percent phosphor powder, 0.05-2 weight percent dispersing agent, 1-3 weight percent surfactant and 1-5 weight percent thickener, with the balance being water totaling 100% by weight. The suspension is then applied as a coating to the inside of the glass tube which is already coated with the underlying coating as described above, and heated to dry, as is known in the art. The phosphor-containing protective layer is applied so that the weight of phosphor in the layer (the "coating weight") is 0.5-3, more specifically 0.8-2, more specifically 1-1.6 mg/cm².

In one aspect, the lamp has no more than two layers inside the glass envelope, these being the described underlying layer and the protective layer. The protective layer faces the arc or is closer to the arc than is the glass envelope with the underlying layer being disposed between the glass and the protective layer. The lamp may have a barrier layer of alumina or silica between the underlying layer 14 and the glass tube 12. In this case the underlying layer is still closer to the arc than the barrier layer and is an inner surface of the tube.

The disclosure will now be described by reference to the following examples, which should not be used in any way to limit the invention that is described by the following claims.

EXAMPLE 1

Five T8 lamps with glass envelopes each having a surface area of 972.88 cm$^2$, a diameter of 25.4 mm and a length of 1219.2 mm were coated with an underlying phosphor-containing layer followed by a protective phosphor-containing layer each having the following phosphor compositions shown in Table 1 following the method described above. Each lamp was filled with argon at a fill pressure in the range of 2.0 to 3.5 torr and a dose of mercury in the range of 2.0 to 4.0 mg. The color points of each of the phosphor layers are provided.

TABLE 1

|  | $Zn_2SiO_4:Mn^{2+}$ | $LaPO_4:Ce^{3+}$, $Tb^{3+}$ | $Y_2O_3:Eu^{3+}$ | $BaMg_2Al_{16}O_{27}:Eu^{2+}$ | ccx | ccy |
|---|---|---|---|---|---|---|
| underlying layer | 44.0% |  | 47.4% | 8.6% | 0.3673 | 0.4181 |
| protective layer |  | 44.0% | 47.4% | 8.6% | 0.3848 | 0.3855 |

Each of the layers was coated on the lamps according to the following surface densities and to have the following ratio of coating densities shown in Table 2. Lamp 4 had no protective layer while lamp 5 had no underlying layer (i.e., no $Zn_2SiO_4:Mn^{2+}$).

TABLE 2

| Sample | Protective layer surface density (mg/cm$^2$) | Underlying layer surface density (mg/cm$^2$) | Protective layer/underlying layer surface density ratio |
|---|---|---|---|
| 1 | 1.64 | 1.54 | 1.10 |
| 2 | 1.03 | 1.44 | 0.72 |
| 3 | 1.03 | 4.11 | 0.25 |
| 4 | 0.00 | 1.34 | 0.00 |
| 5 | 2.67 | 0.00 | — |

Figure 2:
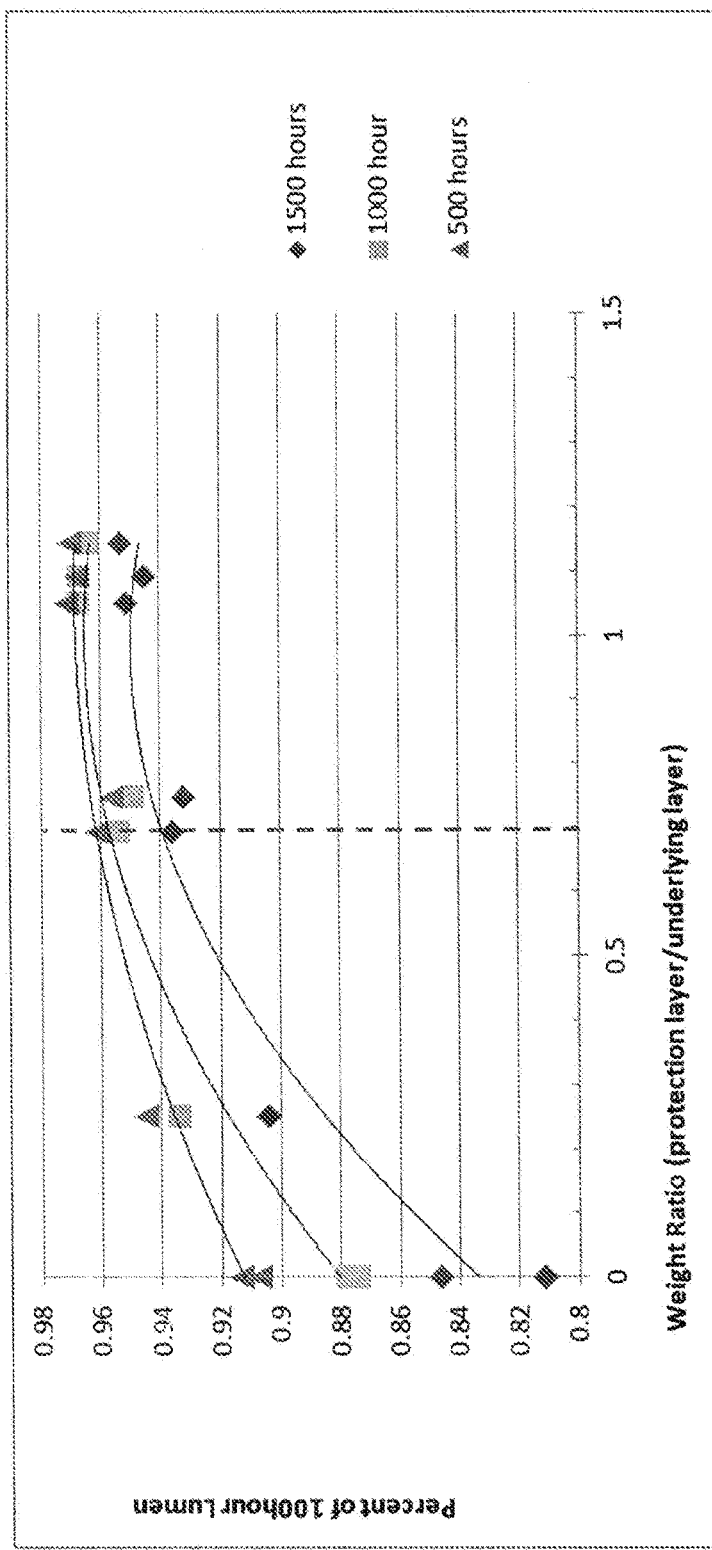
FIG. 2 shows a graph of percent of 100 hour lumens as a function of surface density ratio for lamps burning at 500, 1000 or 1500 hours.

FIG. 2 shows the percent of 100 hour lumens for lamps having the surface density or weight ratios (protective layer/underlying layer surface density ratio) given in Table 2 after lamps are burned for 500 hours, 1000 hours or 1500 hours. It can be seen for a surface density ratio of 0.4 that the percentage of 100 hour lumens was at least 93% after 1000 hours of burning and at least 90% after 1500 hours of burning. These lumen depreciation values are comparable to what is typical for lamps using $(Ca,Ba,Sr)_5(PO_4)_3(F,Cl):Sb^{3+}$, $Mn^{2+}$ halophosphor after 1000 and 1500 hours of burning, and are deemed as commercially acceptable. On the other hand, without a protective layer being applied, the underlying layer containing $Zn_2SiO_4:Mn^{2+}$ phosphor has only about 88% of initial 100 hour lumens after 1000 hours of burning and only about 83% after 1500 hours of burning. For a surface density ratio of at least 0.7 (dotted line in the figure) the percentage of 100 hour lumens was at least about 95% for 1000 hours of burning and at least about 94% for 1500 hours of burning. The surface density ratio of 1.0 produced even higher percentage of 100 hour lumens than the 0.4 and 0.7 surface densities at 1000 and 1500 hours burning (at least about 96% and at least about 95%) but begins to level off. Therefore the surface density ratio should be at least 0.4 and in particular, at least 0.7, more particularly, at least 1.0.

The properties of the lamps are shown in Table 3 below after burning for 100 hours.

TABLE 3

| Total Watts | ccx | ccy | CRI | CCT | Lumens | Lamp LPW |
|---|---|---|---|---|---|---|
| 32.9 | 0.3867 | 0.3855 | 85.1 | 3900.0 | 2799.0 | 85.1 |
| 32.8 | 0.383 | 0.3946 | 84.1 | 4056.5 | 2653.5 | 80.9 |
| 32.8 | 0.3905 | 0.3874 | 85.1 | 3819.4 | 2652.2 | 80.3 |
| 32.3 | 0.3673 | 0.4181 | 80.3 | 4579.0 | 1992.8 | 61.7 |
| 33.0 | 0.3848 | 0.3855 | 85.0 | 3948.4 | 2708.3 | 82.1 |

As can be seen from Table 3 the color rendering index (CRI) was at least about 84 while the lumens per watt was at least about 80 for lamps 1-3 of this invention. Lamp 4 having no protective layer had the lowest lumens per watt of 61.7 showing the effectiveness of the protective layer referring to the higher LPW for lamps 1-3 which had a protective layer.

EXAMPLE 2

Five T8 lamps with glass envelopes each having a surface area of 972.88 cm$^2$, a diameter of 25.4 mm and a length of 1219.2 mm were coated with an underlying phosphor-containing layer followed by a protective phosphor-containing layer each having the following phosphor compositions shown in Table 4 and following the method of the detailed description. Each lamp was filled with argon at a fill pressure of 2.0 to 3.5 torr and a dose of mercury in the range of 2.0 to 4.0 mg.

TABLE 4

|  | $Zn_2SiO_4:Mn^{2+}$ | $LaPO_4:Ce^{3+}, Tb^{3+}$ | $Y_2O_3:Eu^{3+}$ | $(Sr,Ba,Ca)_5(PO_4)3Cl:Eu^{2+}$ | ccx | ccy |
|---|---|---|---|---|---|---|
| underlying layer | 24.4% |  | 58.9% | 16.7% | 0.3900 | 0.3835 |
| protection layer |  | 29.5% | 53.8% | 16.8% | 0.3874 | 0.3830 |

Each of the phosphor layers was coated on the lamps according to the following surface densities and to have the following ratio of surface densities shown in Table 5. Lamp 7 had no protective layer while lamp 6 had no underlying layer (i.e., no $Zn_2SiO_4:Mn^{2+}$).

TABLE 5

| Sample | Protective layer surface density (mg/cm$^2$) | Underlying layer surface density (mg/cm$^2$) | Protective layer/underlying layer surface density ratio |
|---|---|---|---|
| 6 | 2.57 | 0.00 | — |
| 7 | 0.00 | 2.50 | 0.0 |
| 8 | 1.64 | 0.72 | 2.4 |
| 9 | 1.44 | 1.03 | 1.3 |
| 10 | 1.03 | 2.06 | 0.5 |

Figure 3:
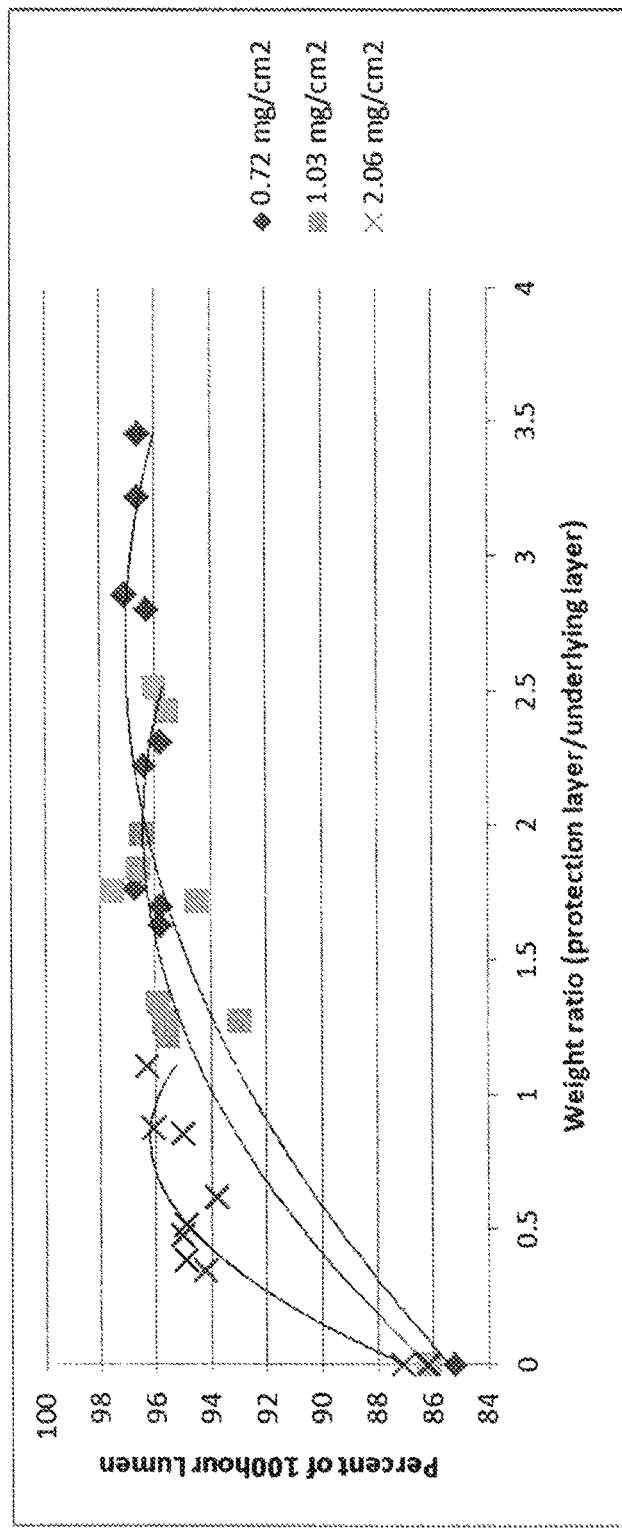
FIG. 3 shows a graph of percent of 100 hour lumens as a function of surface density ratio for different surface densities of the underlying layer.

FIG. 3 shows the effect of surface density or weight ratio (protective layer/underlying layer surface density ratio) on the percentage of 100 hour lumens after lamps are burned for 1000 hr, using three surface densities of the underlying layer, 0.72 mg/cm$^2$, 1.03 mg/cm$^2$ and 2.06 mg/cm$^2$. It can be seen that the thickest underlying layer (containing $Zn_2SiO_4:Mn^{2+}$) at 2.06 mg/cm$^2$ exhibited progressively increasing percentage of 100 hour lumens as the surface density ratio increased from 0.4 to 0.7 to 1.0. The percentage of 100 hour lumens was lower for the thinner underlying layers 1.03 and 0.72 mg/cm$^2$ compared to the highest surface density of 2.06 mg/cm$^2$ up to a surface density ratio of 1.0. However, increasing the surface density ratio to 2.0 and 3.0 resulted in increased percentage of 100 hour lumens that even equaled or exceeded that for the highest underlying layer surface density of 2.06 mg/cm$^2$ at a surface density ratio of up to 1.0. This highlights the significance of the surface density ratio. Using greater surface density ratios with thinner underlying layers can produce equivalent results as lesser surface density ratios with a thicker underlying layers.

The properties of the lamps are shown in Table 6 below after burning for 100 hours. Sample 8-10 of the invention exhibited a CRI of at least 87.3 and a LPW of at least 81.0.

TABLE 6

| Sample | Total Watts | Ccx | Ccy | CRI | CCT | Lumens | Lamp LPW |
|---|---|---|---|---|---|---|---|
| 6 | 33.3 | 0.3874 | 0.3830 | 86.8 | 3863.2 | 2789.4 | 83.8 |
| 7 | 33.1 | 0.3900 | 0.3835 | 83.8 | 3801.3 | 2418.2 | 73.2 |
| 8 | 33.1 | 0.3870 | 0.3835 | 87.3 | 3878.2 | 2723.5 | 82.3 |
| 9 | 33.0 | 0.3868 | 0.3841 | 87.5 | 3886.7 | 2695.4 | 81.7 |
| 10 | 33.1 | 0.3865 | 0.3838 | 87.9 | 3891.8 | 2682.4 | 81.0 |

Measurements of lamp properties were conducted as known in the art and as described in the "Approved Method Electrical and Photometric Measurements of Fluorescent Lamps," IES LM-9-09, IES Illuminating Engineering Society, which is incorporated herein by reference in its entirety.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A fluorescent lamp comprising:
   a glass envelope that is light transmitting;
   means for providing a discharge inside said envelope;
   a discharge-sustaining fill of mercury and an inert gas sealed inside said envelope;
   an underlying phosphor-containing layer disposed inside said envelope, said underlying layer comprising zinc silicate phosphor; and
   a protective phosphor-containing layer disposed over said underlying layer at a location that is more distal from said glass than said underlying layer;
   wherein a ratio of a surface density of said protective layer to a surface density of said underlying layer is at least 0.4:1.

2. The fluorescent lamp of claim 1 wherein said ratio is at least 0.7:1.

3. The fluorescent lamp of claim 1 wherein said ratio is at least 1.0:1.

4. The fluorescent lamp of claim 1 wherein said ratio is at least 2.0:1.

5. The fluorescent lamp of claim 1 wherein said ratio is at least 3.0:1.

6. The fluorescent lamp of claim 1 wherein a surface density of said underlying layer is at least about 0.7 mg/cm$^2$.

7. The fluorescent lamp of claim 1 wherein a surface density of said underlying layer is at least about 1.0 mg/cm$^2$.

8. The fluorescent lamp of claim 1 wherein a surface density of said underlying layer is at least about 2.0 mg/cm$^2$.

9. The fluorescent lamp of claim 1 wherein a combined said surface density of said underlying layer and said protective layer ranges from 2.0 to 4.0 mg/cm$^2$.

10. The fluorescent lamp of claim 1 wherein a combined said surface density of said underlying layer and said protective layer ranges from 2.0 to 3.0 mg/cm$^2$.

11. The fluorescent lamp of claim 1 wherein said protective layer absorbs radiation at a wavelength of 185 nm from said discharge.

12. The fluorescent lamp of claim 1 wherein said underlying layer or said protective layer comprise a phosphor selected from the group consisting of $Y_2O_3:Eu^{3+}$ (YEO); $BaMg_2Al_{16}O_{27}:Eu^{2+}$ (BAM); $BaMg_2Al_{16}O_{27}:Eu^{2+}$, $Mn^{2+}$ (BAMn); $GdMgB_5O_{10}:Ce^{3+}$, $Mn^{3+}$ (CBM); $MgAl_{11}O_{19}$: $Ce^{3+}$, $Tb^{3+}$ (CAT); $GdMgB_5O_{10}:Ce^{3+}$, $Tb^{3+}$ (CBT); $LaPO_4$: $Ce^{3+}$, $Tb^{3+}$ (LAP); $(Sr,Ba,Ca)_5(PO_4)_3Cl:Eu^{2+}$ (SECA); (Ca, Ba,Sr)$_5$(PO$_4$)$_3$(F,Cl):Sb$^{3+}$, Mn$^{2+}$ (halophosphor) and combinations thereof.

13. The fluorescent lamp of claim 12 wherein said phosphor of said protective layer comprises YEO, LAP and BAM.

14. The fluorescent lamp of claim 12 wherein said phosphor of said protective layer comprises YEO, LAP and SECA.

15. The fluorescent lamp of claim 12 wherein said phosphor of said underlying layer comprises YEO, BAM and $Zn_2SiO_4:Mn^{2+}$ as said zinc silicate phosphor.

16. The fluorescent lamp of claim 12 wherein said phosphor of said underlying layer comprises YEO, SECA and $Zn_2SiO_4:Mn^{2+}$ as said zinc silicate phosphor.

17. The fluorescent lamp of claim 1 wherein the only phosphor in said underlying layer is $Zn_2SiO_4:Mn^{2+}$ as said zinc silicate phosphor.

18. The fluorescent lamp of claim 12 wherein said phosphor of said protective layer comprises YEO, LAP and BAM or YEO, LAP and SECA and said underlying layer comprises YEO, BAM and $Zn_2SiO_4:Mn^{2+}$ as said zinc silicate phosphor or YEO, SECA and $Zn_2SiO_4:Mn^{2+}$ as said zinc silicate phosphor.

19. The fluorescent lamp of claim 1 wherein said means for providing a discharge inside said envelope comprises electrodes spaced apart inside said envelope.

20. The fluorescent lamp of claim 1 wherein a CCT of said lamp ranges from 2700° K to 6500° K.

21. The fluorescent lamp of claim 1 wherein the x-y chromaticity of said underlying layer is different than the x-y chromaticity of said protective layer.

22. The fluorescent lamp of claim 1 comprising a barrier layer disposed between said glass and said underlying layer, wherein said barrier layer comprises alumina or silica.

23. The fluorescent lamp of claim 1 wherein said zinc silicate phosphor is $Zn_2SiO_4:Mn^{2+}$.

24. A fluorescent lamp comprising:
a glass envelope that is light transmitting;
electrodes spaced apart inside said envelope for providing a discharge inside said envelope;
a discharge-sustaining fill sealed inside said envelope;
an underlying phosphor-containing layer disposed inside said envelope, said underlying layer comprising zinc silicate phosphor; and
a protective phosphor-containing layer disposed as a separate coating over said underlying layer at a location that is more distal from said glass than said underlying layer, wherein said protective phosphor-containing layer does not include zinc silicate phosphor.

25. The fluorescent lamp of claim 24 wherein a ratio of a surface density of said protective layer to a surface density of said underlying layer is at least 0.4:1.

26. The fluorescent lamp of claim 24 wherein said underlying layer or said protective layer comprise a phosphor selected from the group consisting of $Y_2O_3:Eu^{3+}$ (YEO); $BaMg_2Al_{16}O_{27}:Eu^{2+}$ (BAM); $BaMg_2Al_{16}O_{27}:Eu^{2+}$, $Mn^{2+}$ (BAMn); $GdMgB_5O_{10}:Ce^{3+}$, $Mn^{3+}$ (CBM); $MgAl_{11}O_{19}:Ce^{3+}$, $Tb^{3+}$ (CAT); $GdMgB_5O_{10}:Ce^{3+}$, $Tb^{3+}$ (CBT); $LaPO_4:Ce^{3+}$, $Tb^{3+}$ (LAP); $(Sr,Ba,Ca)_5(PO_4)_3Cl:Eu^{2+}$ (SECA); $(Ca,Ba,Sr)_5(PO_4)_3(F,Cl):Sb^{3+}$, $Mn^{2+}$ (halophosphor) and combinations thereof.

27. The fluorescent lamp of claim 24 wherein the only phosphor in said underlying layer is $Zn_2SiO_4:Mn^{2+}$ as said zinc silicate phosphor.

28. The fluorescent lamp of claim 24 wherein a CCT of said lamp ranges from 2700 ° K to 6500 ° K.

29. The fluorescent lamp of claim 24 wherein the x-y chromaticity of said underlying layer is different than the x-y chromaticity of said protective layer.

30. The fluorescent lamp of claim 24 comprising a barrier layer disposed between said glass and said underlying layer, wherein said barrier layer comprises alumina or silica.

31. The fluorescent lamp of claim 24 wherein said zinc silicate phosphor is $Zn_2SiO_4:Mn^{2+}$.

* * * * *